Figure 1:
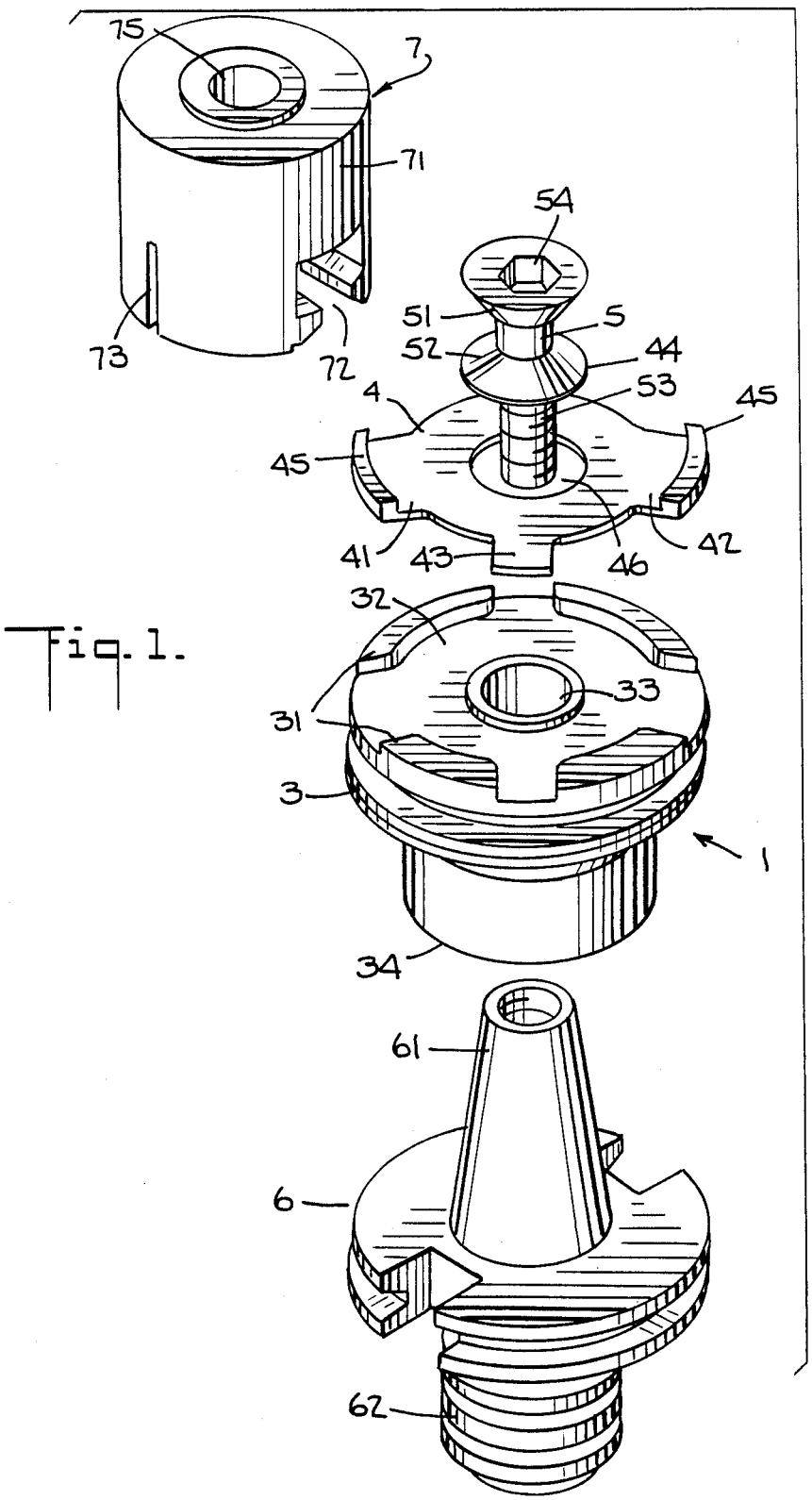

United States Patent [19]

Kappelhof et al.

[11] Patent Number: 4,976,575
[45] Date of Patent: Dec. 11, 1990

[54] TOOL HOLDING SYSTEM FOR AUTOMATIC TOOL CHANGING

[75] Inventors: Heinrich Kappelhof; Gottfried Wolf, both of Schöppingen, Fed. Rep. of Germany

[73] Assignee: AXA-Entwicklungs- und Maschinenbau- gesellschaft für produktionstechnische anlagen und Geräte mbH, Schoeppingen, Fed. Rep. of Germany

[21] Appl. No.: 180,468

[22] Filed: Apr. 12, 1988

[30] Foreign Application Priority Data

Apr. 15, 1987 [DE] Fed. Rep. of Germany ....... 3712820

[51] Int. Cl.⁵ .............................................. B23C 1/00
[52] U.S. Cl. ................................ 409/233; 408/239 A; 279/1 TS; 279/89; 409/230
[58] Field of Search ............... 409/233, 234, 231, 232, 409/230; 279/1 A, 1 W, 1 TS, 89, 93, 94; 408/239 A, 239 R, 35

[56] References Cited

U.S. PATENT DOCUMENTS

| 2,931,659 | 4/1960 | Novkov | 279/89 |
| 4,723,878 | 2/1988 | Kelm et al. | 409/234 |
| 4,729,702 | 3/1988 | Kelm | 409/234 |

FOREIGN PATENT DOCUMENTS

| 101917 | 7/1983 | European Pat. Off. | |
| 162824 | 5/1985 | European Pat. Off. | |
| 202091 | 11/1986 | European Pat. Off. | 279/1 A |
| 3230051 | 8/1981 | Fed. Rep. of Germany | |
| 405666 | 8/1974 | U.S.S.R. | 409/233 |
| 524620 | 8/1976 | U.S.S.R. | 279/89 |

Primary Examiner—Z. R. Bilinsky
Assistant Examiner—Robert Schultz
Attorney, Agent, or Firm—Felfe & Lynch

[57] ABSTRACT

The invention relates to a tool holding system for automatic tool changing in a machine tool, stamping machine or other such machine, wherein the machine has a spindle which has at its free end a gripping means in the form of a sleeve for a tool which can be inserted and removed by a tool changing system, while a draw rod actuating the sleeve by axial displacement is guided in the spindle, and the tool having at the spindle end a tool holding head with an inverted centering frustum cone which can be engaged by a conical inner surface of the sleeve in its clamping position in order to clamp the tool against the spindle. The new tool holding system according to the invention is characterized in that the sleeve is provided with a T-shaped slot open at least at one end, that the spindle end has at least on one side a T-shaped or rectangular slot and that the slots of the sleeve and spindle end are positionable in alignment with one another permitting the introduction and removal of the tool holding head from the side. With the invention the tool changing is simplified and expedited.

8 Claims, 4 Drawing Sheets

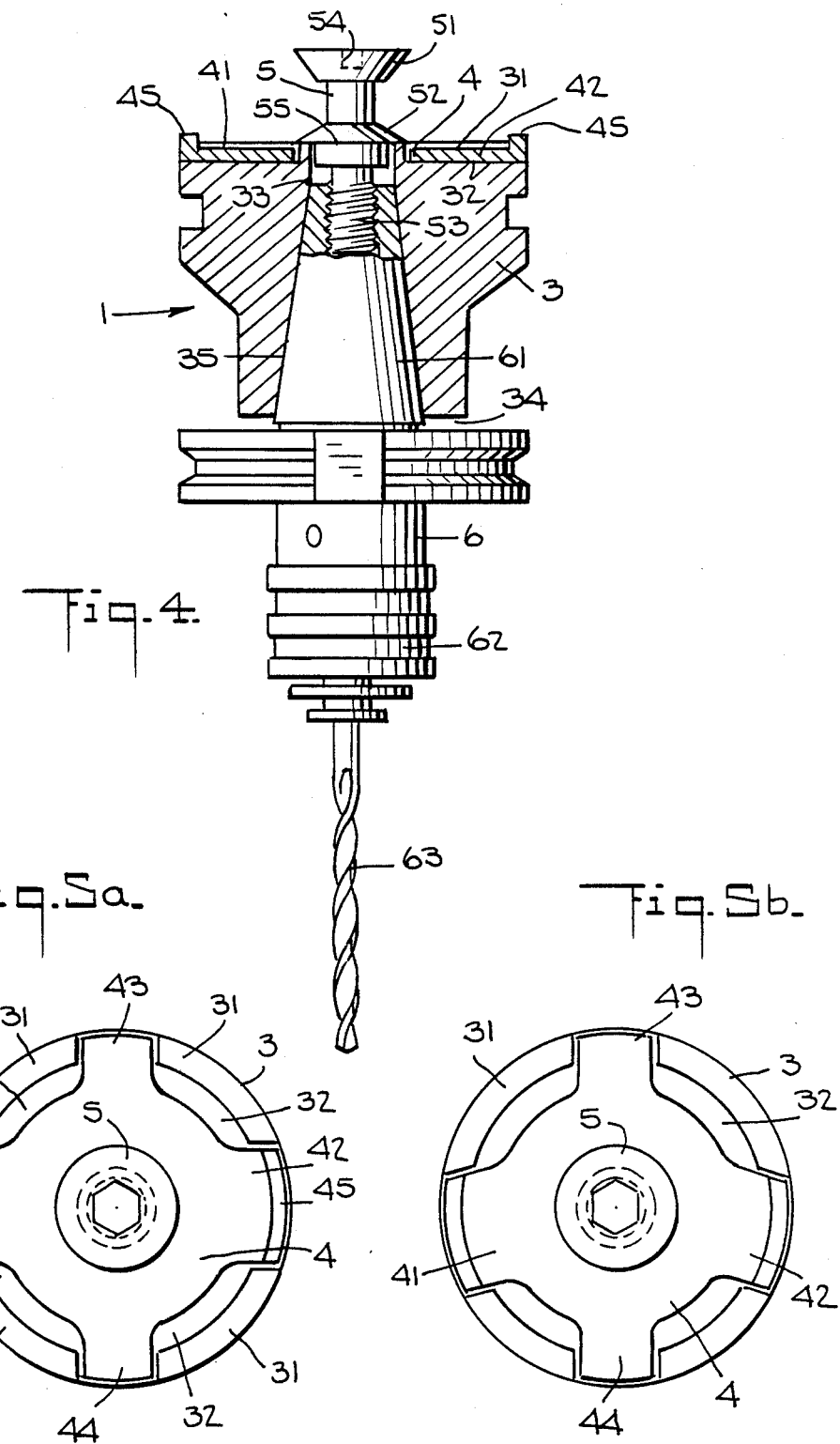

ously needed. The

TOOL HOLDING SYSTEM FOR AUTOMATIC TOOL CHANGING

BACKGROUND OF THE INVENTION

The invention relates to a tool holding system for automatic tool changing in a machine tool, stamping machine or other such machine, in which the machine has a spindle which has in its free end a gripping means in the form of a sleeve which can be inserted and removed by a tool changing system, a draw rod which actuates the sleeve by axial displacement being carried in the spindle, and the tool having at its spindle end a tool holding head having a hollow centering taper of inverted frustum cane shape which, in order to clamp the tool against the spindle, can be engaged by a conical inside surface of the sleeve when it is in its chucking position.

Machine tools with tool holding systems of the kind described are disclosed, for example, in EP No. 01 01 917 B1, DE No. 32 30 051 A1 and EP No. 01 62 924 A2, and serve for the purpose of automatically performing repetitive machining processes rapidly and with great accuracy. In these machines it is common practice to grip the tools or tool holders by means of a tapered or conical shank which is axially drawn or forced into a matching socket in the spindle. The tool changing system in this case performs both a movement substantially perpendicular to the spindle axis to bring the tool up from the side or return it back to the side, as well as a relatively long axial movement for the introduction of the tapered shank into the spindle or bring the shank out of the spindle relative to the latter.

It is disadvantageous in the known machine tools and tool holding systems that, on the one hand, the relatively long course that has to be traveled by the tool in two dimensions greatly complicates the mechanism of the tool changing system, and that, on the other hand, covering this distance when changing tools takes considerable time, inasmuch as the axial movement has to be performed twice, namely once in the removal of the tool and once in the introduction of the next tool. Another disadvantage in known machines is that even relatively small differences in the diameter of the tapered shank of the tool and in the tapered bore in the spindle result in relatively great axial inaccuracies in length and level on account of the augmentation due to conicity.

The problem is therefore to create a tool holding system of the kind described above, by which a more rapid tool change will be made possible and in which a great accuracy of the axial position of the tool will be assured.

SUMMARY OF THE INVENTION

The solution of this problem is accomplished according to the invention in a tool holding system of the kind described above, which is characterized in that the sleeve is provided with a T-slot open at least at one end, that the end of the spindle has a T-slot or rectangular slot at least at one end, and that the slots of the sleeve and of the end of the spindle are positionable in alignment with one another thereby permitting the tool holding head to be inserted and removed from the side.

Advantageously in this case the clamping of the tool holding head and spindle one against the other is performed by a much shorter movement and thus more simply and quickly than has been common heretofore, since at the tool end the axial movement in the changing of tools is almost entirely eliminated. In this tool holding system, if the sleeve is in the appropriately advanced position, the centering cone of the tool can be passed into the interior of the sleeve from the side. By tightening the sleeve via the pull rod the tool holding head is drawn axially to the face end of the spindle and clamped against it. The axial movement to be performed by the sleeve is here very short and is of a length corresponding approximately to the height of the centering cone and which thus amounts to only a fraction of the length of the movement heretofore commonly needed. The tool changing system itself no longer needs to perform an axial movement, and can thus be much simpler in design. On account of the conical shape of the centering cone on the drawbolt and of the mating surface on the sleeve a precise centering of the tool holding head and hence of the tool on the spindle axis is performed. The centering force in this case corresponds to the tightening force exercised by the draw rod, so that the centering is maintained securely even when there is lateral stress on the tool. Another advantage is that the sleeve has no moving parts, thus improving reliability of operation and reducing wear. This is made possible by the fact that the centering cone enters into the sleeve from the side, and is not introduced as formerly from below into an at first open and then closing sleeve with radially movable jaws. The tool holding head itself still travels only a minimal distance, amounting in practice to 1 to 2 mm for example, while the movement of the sleeve is slightly greater and corresponds approximately to the height of the centering cone, which in practice is, for example, 6 to 8 mm. The axial movements to be performed are thus extremely short, which makes for decidely quicker tool changing. Practical experiments have shown that the tool changing time can be shortened to about 1/5 of the original time, which decidedly reduces the unproductive time of the machine.

The arrangement of the sleeve and centering cone on the spindle and tool holding head is basically open, i.e., reversible. Since, however, the manufacture of a sleeve is more complex than that of a centering cone, the centering cone is preferably disposed on the face end of the tool holding head and the sleeve on the end of the draw rod.

To permit the easy use of different types of tool changing systems with the tool holding system according to the invention, provision is made for the slots in the sleeve and spindle to be in alignment with one another in a straight line or in an arcuate line, depending on the design of the tool changing system, and to run all the way through the sleeve and spindle so as to permit the tool holding head to pass through them. The tool changing system can thus have either a rectilinear tool shift or an arcuate tool shift, which advantageously permits easy retrofitting or conversion of machine tools already on hand, independently of the type of tool changing system and without replacing the system. Furthermore, this pass-through possibility contributes to quick tool changing whenever a tool is to be selected arbitrarily from a plurality of tools.

One advantageous embodiment of the invention is characterized in that the centering cone is at the head end of a drawbolt projecting centrally from a substantially flat end face of the tool holding head, and that the tool holding head can be clamped with its face end flat against an end face of the spindle facing it, with centering provided by the cooperating conical surfaces of the centering cone and the sleeve. This configuration makes the manufacture of the individual parts simple and inexpensive. Since the end surfaces of the spindle and tool holding head which are placed against one another can have a relatively large diameter, this, combined with the great clamping force of the sleeve and pull rod, renders virtually impossible any tilting of the holding head and spindle against one another, even in the case of great lateral forces.

In order to assure that, even when a high torque is being applied, a reliable flow of force from the spindle to the tool holding head will remain assured, provision is made such that, between the tool socket head and the spindle, a flat driving spider of many—at least four—arms is disposed with clearance perpendicular to the longitudinal axis of the spindle, at least two arms situated opposite one another thrusting against the spindle and two other arms situated opposite one another thrusting against the tool holding head for the transfer of the torque. This configuration and arrangement of the driving spider brings it about that the spider and the spider alone can transmit torque. Mechanical redundancy is thereby avoided, so that the transmission of other forces that might impair the centering of the tool holding head is excluded.

To simplify the mechanical design of the tool holding system provision is made that the arms of the driving spider thrusting against the spindle have projections extending from the end and engaging the slot present in the spindle, and that the arms of the driving spider are sunk in a mating recess in the end face of the tool holding head which permits lateral free play perpendicular to the longitudinal axis of the spindle. The slot that is present is used for the output of torque from the spindle, and thus it has advantageously a dual function. The recess in the face end of the tool holding head is, like the driving spider itself, is relatively simple and hence inexpensive to manufacture, even in this configuration.

In order to assure that the driving spider cannot be lost in operation it is desirable for the driving spider to have a central opening, for the drawbolt to be passed through this opening and screwed into the tool holding head, and for the drawbolt to have a hold-down collar which is above the driving spider in the screwed-in state with clearance from the latter. In case the driving spider has to be replaced the drawbolt can be unscrewed from the rest of the tool holding head.

On account of the necessary axial displaceability of the sleeve it can occur that, after a relatively long time of operation, a lateral free play between the sleeve and the spindle will occur. In view of the 1/100 mm tolerances of tool location that is required today, free play should be avoided insofar as possible. This is accomplished according to the invention in that the sleeve has a slot in its lower part in addition to its T-slot. This slot together with the T-slot assures that the sleeve in the tightened state will easily expand in its lower part under the effect of the pressure between the surfaces of the centering cone of the drawbolt and the conical countersurface of the sleeve, until it is tightly seated in the interior of the spindle, thereby leaving the centering unaffected but compensating for any free play that may be present or any wear that occurs.

Lastly, provision is made for the tool holding head to be in the form of an adapter with a conical recess in its bottom to accommodate a conventional tool or tool holder equipped with a taper shank. This configuration opens the possibility for the users of the new tool holding system to continue to use the relatively expensive tools and tool holders that are still on hand. For the user this facilitates a changeover to the new holding system, since the extra cost of replacing tools is avoided, and only the adapters have to be additionally purchased.

Figure 2:
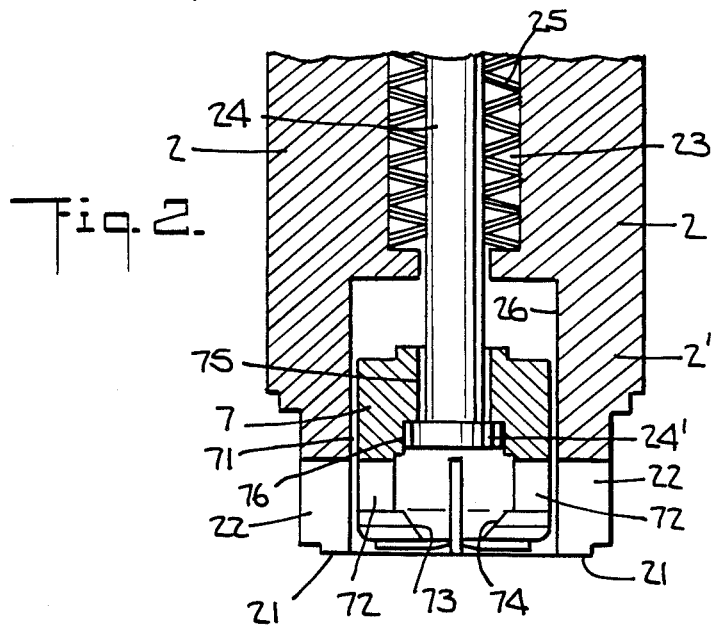
Figure 3A:
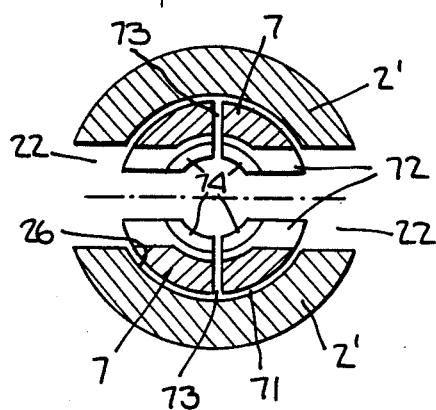
Figure 3B:
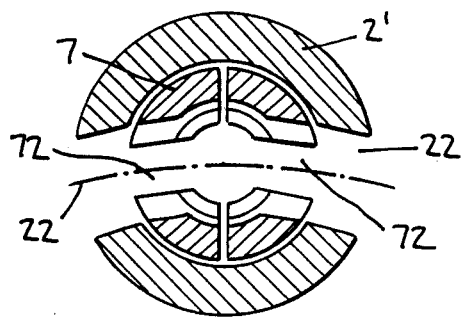
Figure 3C:
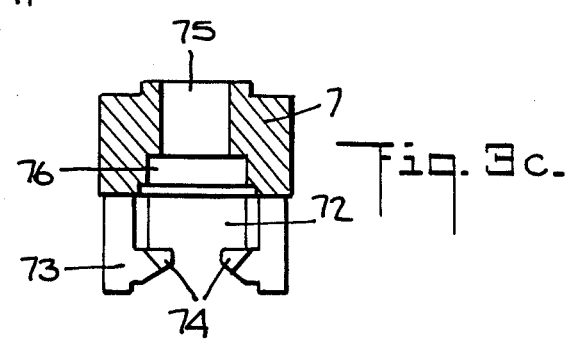
Figure 6:
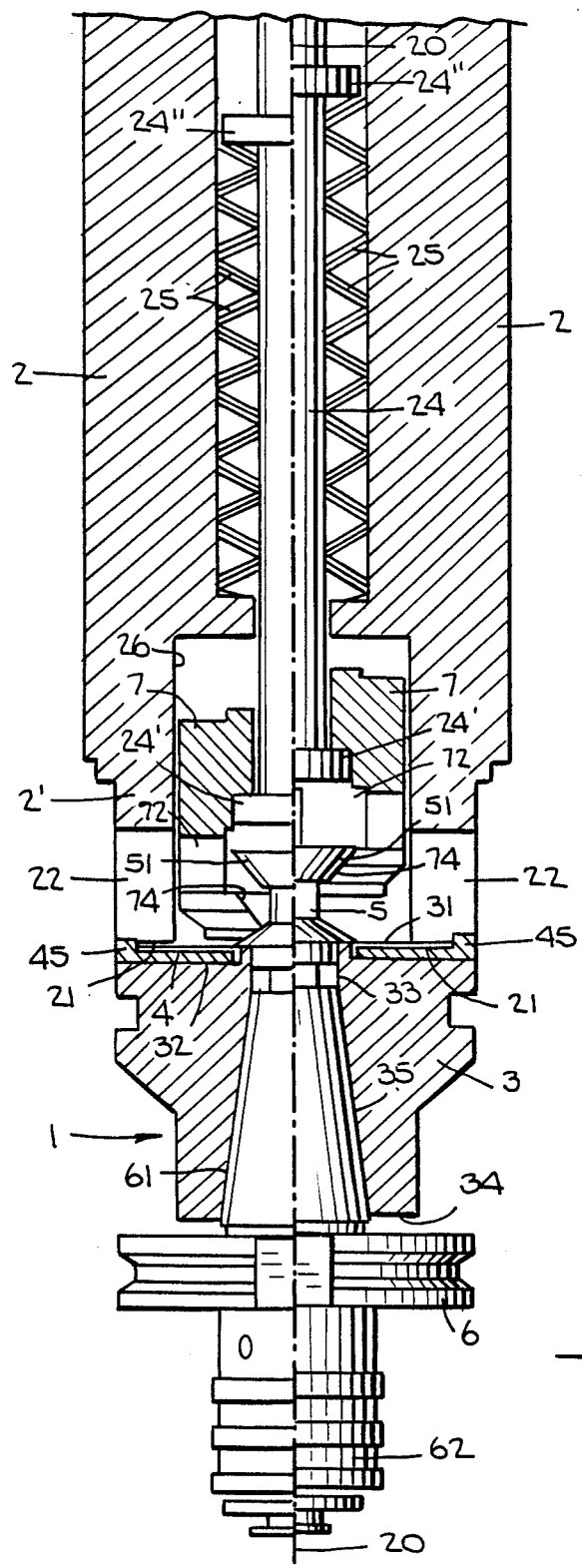

Preferred embodiments of the invention will be explained below with the aid of a drawing, wherein:

FIG. 1 is an exploded perspective view of a tool holding head with spider and drawbolt as well as a tool holder and a sleeve as parts of the tool holding system, FIG. 2 is a view partially in longitudinal cross section and partially in elevation of a spindle of a machine tool with a sleeve guided therein, FIG. 3a shows the bottom end of the spindle with the sleeve in cross section, in a first embodiment, FIG. 3b the bottom end of the spindle with the sleeve, also in cross section, in a second embodiment, FIG. 3c a longitudinal cross section of the sleeve of FIG. 2 in a position rotated about 90° on its longitudinal axis, FIG. 4 a longitudinal cross section, partially in elevation, of the tool holding head from FIG. 1 in the assembled state with a tool holder and tool inserted, FIG. 5a shows the tool holding head in an view of its end face, in a first embodiment corresponding to FIG. 3a, FIG. 5b the tool holding head again in a view of its end face, in a second embodiment corresponding to FIG. 3b, and FIG. 6 shows the spindle with spindle, tool holding head and tool holder in longitudinal cross section, partially in elevation, while the left part of FIG. 6 shows the spindle and holding head in the loosened state and the right part of FIG. 6 shows the spindle and holding head in the tightened state.

From FIG. 1 of the drawing it can be seen that the embodiment of the tool holding head 1 consists of three parts, namely a base body 3, a driving spider 4 and a drawbolt 5. The base body 3 has a rotationally symmetrical form with a diameter in the upper part that is greater than that of the lower part. The end face 31 of the body 3 is substantially flat, while a recess 32 is created in the end face 31 for the driving spider 4. Centrally though the base body 3 runs a bore 33 from the end face 31 to the body bottom 34. This bore 33 serves to accommodate the lower part 53 of the drawbolt 5. The driving spider 4 has, in this embodiment, four arms 41, 42, 43 and 44 which have two different configurations. The oppositely lying arms 41 and 42 have each on their outer end the upturned projections 45 which serve, in a manner to be described later on, to receive a torque put out by a machine tool spindle. The arms 43 and 44 are entirely flat and, in the assembled state of the tool holding head 1, they fit into mating openings between the portions of the end face 31. The recess 32 for the driving spider 4 is so dimensioned that the spider 4 has a lateral clearance in the recess 32. Furthermore, the width of arms 41 and 42 is made such that they cannot come into contact with the lateral boundaries of the recess 32. Only the two arms 43 and 44 contact the boundaries of the recess 32 at their outer ends.

As it can furthermore be seen in FIG. 1, the drawbolt 5 can be passed with its bottom portion 53 through a central opening 46 in the driving spider. At its upper end the drawbolt 5 has an inverted centering frustum cone 51 which serves for the simultaneous centering and locking of the tool holding head 1 on a spindle of the machine tool. At a distance below the centering cone 51 the drawbolt has a projecting hold-down collar 52 whose diameter is greater than the diameter of the central opening 46 in the driving spider 4. As a result, the spider 4 cannot drop out when the tool holding head 1 is in the assembled state. In the upper end face of the drawbolt 5, or, more precisely, of the centering cone 51, a hexagonal hole 54 is present, in this embodiment, for the accommodation of a corresponding hexagonal wrench.

In the lower part of FIG. 1 is represented a tool holder 6 of the conventional kind which, in the case of the illustrated configuration of the tool holding head 1 can be connected to the latter. For this purpose the base body 3 of the tool holding head 1 has a conical bore on its bottom 34, which is not visible in this figure, and into which the tapered shank 61 of the tool holder 6 can be inserted. The tapered shank 61 has a threaded bore in its interior, which is open at the top, and into which the bottom, likewise threaded end 53 of the drawbolt 5 can be screwed after the assembly of the individual parts of the tool. Lastly, the bottom part of the tool holder 6 forms a collet 62 for accommodating a drill, an end mill, or the like.

In the upper part of FIG. 1 is shown a sleeve 7 which has a cylindrical outside surface 71. In the upper part of the sleeve 7 can be seen a central opening 75 which serves for the introduction of a draw rod later to be described. In the lower right portion of the outside 71 of the sleeve 7 can be seen a substantially T-shaped slot 72 which is of such dimensions that the centering cone 51 of the drawbolt 5 can be inserted from the side into the interior of the sleeve 7. In the lower left portion of the outside 71 of the collet there is lastly to be seen another slot 73 which serves to permit a slight expansion of the bottom part of the sleeve 7.

In FIG. 2 of the drawing can be seen the arrangement of the sleeve 7 with the corresponding, previously mentioned draw rod 24 in the interior of a spindle 2 of a machine tool. In the area of its lower end 2' the spindle 2 is of hollow construction and thus forms a cylindrical sleeve guide 26. The sleeve 7 is displaceable axially in this guide 26 with virtually no free play. The draw rod 24, being connected to the sleeve by means of a head 24' at its bottom end which is disposed in a recess 76 in the sleeve, serves for the displacement of the latter. The draw rod 24 is biased in the direction of the pull, i.e., upwardly in FIG. 2, by plate spring packets 25 which are disposed in the spindle 2 in a cavity 23 surrounding the rod. A hydraulic cylinder engaging the upper end, not shown, of the rod 24 serves to move the rod 24 downwardly, as is the common practice in conventional machine tools. As FIG. 2 further shows, the bottom end of the draw rod 24 runs through the opening 75 through the upper part of the sleeve 7. In practice, the outside 71 of the sleeve is in contact with the sleeve guide 26 of the spindle 2, but in FIG. 2 a visible gap is shown between the two for better comprehension.

In the bottom part of the sleeve 7 the shape of the T-shaped slot 72 can be seen, which in the present embodiment runs all the way through the sleeve. Furthermore, the sleeve 7 has in its bottom part an interior, conical countersurface 74 for the centering cone 51 of the drawbolt 5. The interaction of the drawbolt 5, the centering cone 51 and the sleeve 7 with its conical countersurface 74 will be further explained below in conjunction with FIG. 6.

Moreover, FIG. 2 also shows the slot 73 that runs through the bottom part of the sleeve 7, turned approximately 90° from the slot 72.

It can furthermore be seen that the bottom end 2' of the spindle 2 is likewise slotted, the slot 22 being in this case of a rectangular shape and being aligned with the slot 72 in the sleeve 7. The end face 21 of the spindle 2 is flat in the present embodiment, and has a diameter that is substantially equal to the diameter of the end face 31 of the base body 3 of the tool holding head 1. FIGS. 3a and 3b show two different constructions of spindle 2 and sleeve 7, the difference being in the shape of the slots 22 and 72, respectively. FIG. 3a shows an embodiment in which the slots 22 in the bottom spindle end 2' and the T-shaped slot 72 in the sleeve 7 run rectilinearly through the spindle end 2' and sleeve 7. In FIG. 3a can also be seen the shape of the slots 73 at an approximate right angle to the T-shaped slot 72 in the sleeve 7. The outside 71 is round, as it is especially seen in this figure, and is surrounded by the inside of the spindle end 2' forming the sleeve guide 26. Lastly, in FIG. 3a can be seen the conical countersurface 74 to the centering cone 51 of the drawbolt 6, this countersurface 74 being divided into four parts.

In the embodiment represented in FIG. 3b, unlike the example in FIG. 3a, the slots 22 in the spindle end 2' and the T-shaped slot 72 in the sleeve 7 run along a curved line. This makes it possible to run a tool holding head, or more precisely its centering cone 51, along a straight path or a curved path into or out of the center of the sleeve 7, according to how the tool changing system is configured.

FIG. 3c shows the sleeve 7 from FIG. 2 represented in the same manner but in a position turned approximately 90° about the longitudinal axis. The observer's view passes through the T-shaped slot 72, while the slots 73 are in the plane of the drawing. In the upper part of the sleeve 7 can again be seen the central opening 75 with the socket 76 at its bottom end for the draw rod or its head. Lastly, in the bottom part of the sleeve 7 in FIG. 3c can also be seen the arrangement and shape of the conical countersurface 74.

FIG. 4 is an elevation, partially in cross section, of the tool holding head 1 together with a conventional tool holder 6 in the assembled state. The central portion of the tool holding head 1 is formed by the base body 3, in whose upper end can be seen the recess 32 with the driving spider 4 laid therein. As it can be seen in this representation, the end face 31 projects above the upper edge of the driving spider 4, so that even when the tool holding head 1 is in contact with a spindle of a machine tool the spider retains a lateral free play. On the driving spider 4 the two arms 41 and 42 are here visible, on whose outer ends the upward projections 45 are located. The drawbolt 5 extends upward from the center of the end face 31 of the base body and its upper end is formed by the centering cone 51 with the hexagonal hole 54 situated therein. Under the centering cone 51 the hold-down collar 52 is disposed on the drawbolt, which provides so that the driving spider 4 has a lateral free play but no particular freedom to move upwardly.

In the interior of the base body 3 can be seen the central bore 33 as well as the conical socket 35. The conical shank 61 of the tool holder 6 is inserted into the conical socket 35 in the bottom 34 of the base body. The base body 3 and the tool holder 6 are locked together by the drawbolt 5 screwed at its lower threaded end 53 into the conical shank 61. To assure a precise concentricity of the drawbolt 5 and tool holder 6 the drawbolt 5 has underneath the hold-down collar 52 a central projection 55 which, when the drawbolt 5 and tool holder 6 are screwed together, is press-fitted in the central bore 33 in the base body 3. The gap seen in FIG. 4 between the edge 55 and bore 33 appears in the drawing only for greater clarity of representation. The bottom end of the tool holder 6 is formed by the collet 62, into which a drill 63 is inserted in the present embodiment for the sake of example.

FIGS. 5a and 5b are views of two embodiments of the tool holding head, the embodiment in FIG. 5a corresponding to the spindle and sleeve embodiment according to FIG. 3a and the embodiment in FIG. 5b corresponding to the embodiment of spindle and sleeve in FIG. 3b. FIG. 5a shows the end face 31 of the base body 3 as well as the recess 32 disposed in that end face for the driving spider 4. In the center of FIG. 5a can be seen the drawbolt 5, or more precisely the top of the centering cone 51. The driving spider 4 inserted in this embodiment into the recess 32 in the base body 3 has, as previously explained, four arms 41, 42, 43 and 44, separated by a 90° angle. The projections 45 can again be seen at the ends of arms 41 and 42.

In contrast, the arms 41 and 42 of the driving spider 4 shown in the embodiment in FIG. 5b are not arranged at right angles to the other two arms 43 and 44, but are shaped so that they run parallel to a curved line. Accordingly the recess 32 is shaped congruently in the end face 31 of the base body 3. Independently of this, the drawbolt 5 retains its central position as it does also in the embodiment shown in FIG. 5a.

The different configurations of the driving spider 4 and the end face 31 of the base body 3 of the tool holding head 1 serve to establish the position and shape of the arms 41 and 42 of the driving spider such that the arms 41 and 42 fit with their projections 45 precisely into the slots 22 of the corresponding spindle 2 which is shaped accordingly.

Lastly, FIG. 6 shows the spindles 2 of a machine tool with a tool holding head 1 installed thereon in two states of operation, namely on the left side of FIG. 6 in the untightened state and on the right side of FIG. 6 in the tightened state.

In the upper part of FIG. 6 can be seen first the spindle 2 which retains its position during the tightening process. The rod 24 is placed under a mechanical bias by plate spring packs 25 disposed in the cavity 23 and surrounding the rod 24. A head 24" is provided at the upper part of the rod 24 serve as an abutment for the plate springs 25. In the left part of FIG. 6, i.e., in the part of the drawing which is on the left of the central axis, the rod 24 is pushed downwardly. Accordingly the sleeve 7 is pushed downwardly in its guide 26 in the lower end 2' of the spindle 2. In this downwardly pushed position the T-shaped slot 72 in the sleeve 7 is in line with the slot 22 in the spindle end 2'. As it can be seen in the drawing, with the sleeve 7 in this position, the tool holding head 1 can be passed from the side through the slot 22 into the center of the slot 72 without having to perform axial movements. In this state the centering cone 51 lies free above the conical countersurface 74 of the sleeve 7. Between the face end 31 of the base body 3 of the tool holding head 1 and the end face 21 of the spindle end 2' there remains a small gap which suffices for the unhampered installation of the tool holding head 1 from the side. The projection 45 of the driving spider 4 already lies partially in the slot 22 in the spindle end 2'.

From the right side of FIG. 6 it is apparent that the draw rod 24 is now shifted upward by a certain amount, so that the sleeve 7, which is joined to the draw rod 24 by its head 24', is also shifted upward. In this state the conical countersurface 74 of the draw rod 7 fully and tightly engages the centering cone 51. On account of the great force exerted by the plate spring packet 25 on the draw rod 24, the tool holding head 1 is precisely and steadily centered in the lower part of the slot 72 of the sleeve 7 by the cooperation of the centering cone 51 and the conical countersurface 74.

As FIG. 6 furthermore shows, in this chucking operation the tool holding head 1 as well as the drawbolt 5 perform only a very slight axial movement. Consequently a tool change can be performed very rapidly.

The transfer of torque from the bottom end 2' of the spindle 22 to the tool holding head 1 is performed through the driving spider 4, the torque output from the spindle end 2' to the driving spider 4 being performed through the projections 45 engaging the boundaries of the slots 22.

In the bottom part of FIG. 6, it can be seen that, as previously explained, a conventional tool holder 6 with its conical shank is inserted into the bottom 34 of a mating socket 35 in the base body 3, where it is bolted by means of the drawbolt 5. The hold-down collar 52 again forms the bottom part of the tool holder 6. Alternatively, the tool holding head 1 can also be provided directly with a sleeve.

We claim:

1. Tool holding system for automatic tool changing comprising: a spindle which has a longitudinal axis and which has a free end and which has in its free end sleeve means for gripping a tool holder which can be inserted and removed by a tool holder changing system, a draw rod coupled to the sleeve means and actuating the sleeve means by axial displacement, the sleeve means having a conical inside surface, a tool holder having a spindle end, a tool holding head having a spindle end and a tool end with said tool end of said tool head having a means receiving and securing said spindle end of said tool holder and said spindle end of said tool head having an inverted centering frustum cone which, to clamp the tool head against the spindle, is held by the sleeve means in a gripping position with the conical inside surface of the sleeve means, the sleeve means having a T-shaped slot open at at least one end, the spindle free end having at least one side having a through slot sized for lateral passage of said frustum cone, means for transferring torque from said spindle to said tool head, and the slots of the sleeve means and the end of the spindle being positioned in alignment with one another permitting the insertion and removal of said frustum cone of the tool holding head into and from said at least one side of said spindle end.

2. Tool holding system according to claim 1, in which the slots in the sleeve and spindle run entirely through the sleeve and spindle to permit the tool holding head to be passed through them in alignment with one another, on at least one of a straight line and an arcuate line.

3. Tool holding system according to claim 1, in which the tool holding head has a substantially flat end face, said frustum cone being provided on a head of a drawbolt projecting centrally from the substantially flat end face of the tool holding head, and in which the tool holding head is clamped with its end face flat against a confronting end face of the spindle with centering by the cooperating centering cone and the conical inside surface of the sleeve.

4. Tool holding system according to claim 1, in which the means for transferring torque between the tool holding head and the spindle comprises an at least four-armed, flat driving spider disposed with free play perpendicular to the longitudinal spindle axis, at least two arms lying opposite one another thrusting against a projection means on the free end of the spindle and two other arms lying opposite one another thrusting against a projection means on the tool holding head for torque transfer.

5. Tool holding system according to claim 4, in which the arms of the driving spider thrusting against the spindle have terminal upturned projections engaging the projection means on the spindle, and in which the driving spider is disposed in a recess forming an end face of the tool holding head, the recess defining the projection means of the tool holding head and permitting a lateral free play perpendicular to the longitudinal axis of the spindle.

6. Tool holding system according to claim 4, in which the driving spider has a central opening, and which includes a drawbolt, on which the frustum cone is fixed, which extends through this opening and is screwed into the tool holding head by a threaded means and in which the drawbolt has, when in a screwed-in state, a hold-down collar projecting above the driving spider and running at a distance from the latter.

7. Tool holding system according to claim 1, in which the sleeve has in addition to a T-slot, a a longitudinally extending expansion slot extending rearwardly from a forward end thereof.

8. Tool holding system according to claim 1, in which the receiving means of the tool holding head comprises a conical socket, and the toolholder having a conical shank received in said socket.

* * * * *